United States Patent
Rambacher et al.

(10) Patent No.: US 10,259,168 B2
(45) Date of Patent: Apr. 16, 2019

(54) DEVICE FOR FIXING AN EDGE MATERIAL

(71) Applicant: HOLZ-HER GmbH, Nuertingen (DE)

(72) Inventors: Markus Rambacher, Kornwestheim (DE); Rainer Hummel, Reutlingen (DE); Fabian Burk, Aichtal (DE); Denis Lorber, Grossbettlingen (DE); Juergen Leuze, Tuebingen (DE); Andreas Kuhlmann, Schwerin (DE)

(73) Assignee: HOLZ-HER GmbH, Nuertingen (DE)

( * ) Notice: Subject to any disclaimer, the term of this patent is extended or adjusted under 35 U.S.C. 154(b) by 227 days.

(21) Appl. No.: 15/263,446

(22) Filed: Sep. 13, 2016

(65) Prior Publication Data

US 2017/0129164 A1   May 11, 2017

Related U.S. Application Data

(63) Continuation of application No. PCT/EP2015/055286, filed on Mar. 13, 2015.

(30) Foreign Application Priority Data

Mar. 19, 2014   (DE) ........................ 10 2014 103 725

(51) Int. Cl.
  *B29C 65/48*   (2006.01)
  *B27D 5/00*   (2006.01)
  *B29C 65/14*   (2006.01)

(52) U.S. Cl.
  CPC .............. *B29C 65/48* (2013.01); *B27D 5/003* (2013.01); *B29C 65/14* (2013.01)

(58) Field of Classification Search
  CPC .......... B29C 65/48; B29C 65/14; B27D 5/003
  See application file for complete search history.

(56) References Cited

U.S. PATENT DOCUMENTS

| | | |
|---|---|---|
| 3,864,547 A | 2/1975 | Ray |
| 4,029,935 A | 6/1977 | Archer et al. |
| 4,067,762 A * | 1/1978 | Rhoads ................. B29C 63/003 |
| | | 156/250 |
| 4,222,812 A | 9/1980 | Duewel |

(Continued)

FOREIGN PATENT DOCUMENTS

| | | |
|---|---|---|
| DE | 1621814 | 5/1973 |
| DE | 2622074 | 12/1976 |

(Continued)

OTHER PUBLICATIONS

International Search Report for corresponding application No. PCT/EP2015/055286 dated May 26, 2015, 3 pages.

*Primary Examiner* — Daniel McNally
(74) *Attorney, Agent, or Firm* — Lipsitz & McAllister, LLC (57) ABSTRACT

A device for fixing an edge material to a narrow side of a panel-shaped workpiece is provided, which has a feed mechanism for supplying the edge material to the narrow side of the workpiece, at least one infrared emitter for activating an adhesive layer, facing the workpiece, of the edge material, and a pressing mechanism for pressing the edge material onto the narrow side of the workpiece. In order to activate the adhesive layer of the edge material by means of infrared radiation using a reliable process without adversely affecting the visible face of the edge material, a radiation exposure zone with a specifiable size is arranged in the feed path of the edge material. In the exposure zone, the adhesive layer of the edge material is exposed to infrared radiation. The device has a guide mechanism for guiding the edge material through the radiation exposure zone.

31 Claims, 8 Drawing Sheets

(56) References Cited

U.S. PATENT DOCUMENTS

| | | | |
|---|---|---|---|
| 4,409,060 A * | 10/1983 | Janssens | B27D 5/003 |
| | | | 156/497 |
| 6,263,938 B1 | 7/2001 | Maioli et al. | |
| 7,422,650 B2 * | 9/2008 | McGlinchy | E06B 3/67339 |
| | | | 156/109 |
| 8,875,767 B2 | 11/2014 | Schmid et al. | |
| 8,945,333 B2 | 2/2015 | Schumacher | |
| 2010/0269971 A1 | 10/2010 | Schmid et al. | |
| 2011/0183122 A1 | 7/2011 | Schumacher | |
| 2012/0048473 A1 * | 3/2012 | Schmid | B23K 26/0846 |
| | | | 156/380.9 |
| 2014/0014266 A1 | 1/2014 | Schulte-Goebel | |

FOREIGN PATENT DOCUMENTS

| | | |
|---|---|---|
| DE | 2810565 | 9/1979 |
| DE | 3415747 | 9/1985 |
| DE | 3732157 | 5/1989 |
| DE | 10038005 | 11/2002 |
| DE | 102008003747 | 6/2009 |
| DE | 202006020669 | 8/2009 |
| DE | 202009005667 | 8/2009 |
| DE | 202009009253 | 12/2009 |
| DE | 102006056010 | 2/2010 |
| DE | 202009016025 | 3/2010 |
| DE | 19955575 | 4/2010 |
| EP | 0945235 | 9/1999 |
| EP | 1445082 | 8/2004 |
| EP | 1163864 | 9/2004 |
| EP | 1852242 | 2/2009 |
| EP | 2243619 | 10/2010 |
| EP | 2397287 | 12/2011 |
| EP | 2422947 | 2/2012 |
| GB | 2081642 | 2/1982 |
| WO | 2012/130224 | 10/2012 |

* cited by examiner

DEVICE FOR FIXING AN EDGE MATERIAL

This application is a continuation of international application number PCT/EP2015/055286 filed on Mar. 13, 2015 and claims the benefit of German application number 10 2014 103 725.1 filed on Mar. 19, 2014, which are incorporated herein by reference in their entirety and for all purposes.

BACKGROUND OF THE INVENTION

The invention relates to a device for fixing a band-shaped or strip-shaped edge material to a narrow side of a panel-shaped workpiece, wherein the device has a feed mechanism for supplying the edge material along a feed path to the narrow side of the workpiece, and also at least one infrared emitter for activating an adhesive layer, facing the workpiece, of the edge material, and a pressing mechanism for pressing the edge material onto the narrow side of the workpiece.

Devices for fixing a band-shaped or strip-shaped edge material are used for example in edge-processing machines. In such machines, a panel-shaped workpiece, in particular a wooden workpiece, is moved continuously in a transport plane, and with the aid of a fixing device of the above-mentioned type a band-shaped or strip-shaped edge material, which is frequently also referred to as an "edge veneer", can be supplied to a narrow side of the workpiece which is oriented parallel to the direction of transport of the workpiece. The edge material has an activatable adhesive layer on its side facing the workpiece. During the supplying of the edge material to the narrow side of the workpiece, the adhesive layer is activated, and then the edge material is pressed against the narrow side of the workpiece and is thereby fixed to the narrow side. In many cases, the workpiece is then, together with the edge material fixed to the narrow side, sent for subsequent processing, in which regions of the edge material projecting over the workpiece in the direction of transport are separated off from the workpiece.

Many different configurations of devices for fixing an edge material to a narrow side of a panel-shaped workpiece are known. Frequently, a heat-activatable hot-melt adhesive is used as the adhesive layer of the edge material. The hot-melt adhesive may be activated for example with the aid of hot air under pressure or alternatively with the aid of plasma irradiation. Such devices are known to the person skilled in the art for example from WO 2012/130224 A1 and DE 20 2009 009 253 U1. It has also already been proposed to use an edge material which consists of two preferably coextruded plastics-material layers of different hardnesses. One of the plastics-material layers forms an adhesive layer which can be activated by exposing it to laser radiation in order to bond the edge material to the workpiece. Such plastics materials are known for example from EP 1 163 864 B1 and EP 1 852 242 B1.

The activation of the adhesive layer of the edge material with the aid of a laser beam is also known from DE 10 2006 056 010 B4. However, it necessitates a laser source which is cost-intensive and of complex design, and requires a not inconsiderable lead time before the device can actually be used for fixing the edge material.

A considerable lead time is also necessary in order to activate the adhesive layer of the edge material with the aid of hot air under pressure or in general with the aid of a hot gas under pressure. Furthermore, this procedure too involves not inconsiderable costs.

The equivalent also applies to the activation of the adhesive layer with the aid of plasma irradiation. The plasma irradiation requires not inconsiderable expense in terms of apparatus and likewise involves a considerable lead time before the adhesive layer of the edge material can actually be activated.

It has also already been proposed to use an infrared emitter to activate the adhesive layer, for example in DE 20 2006 020 669 U1 or alternatively in DE 20 2009 009 253 U1. Infrared emitters are known per se to the person skilled in the art for heating purposes. When irradiating the edge material with infrared radiation, there is however the difficulty that merely the adhesive layer on the rear side of the edge material is to be activated by means of the infrared radiation, but the visible face of the edge material should not be adversely affected by the infrared radiation.

It is therefore an object of the present invention to develop a device of the generic type such that the adhesive layer of the edge material can be activated with the aid of infrared radiation using a reliable process without adversely affecting the visible face of the edge material.

SUMMARY OF THE INVENTION

This object is achieved according to the invention in a device of the type referred to first hereinbefore in that a radiation exposure zone with a specifiable size is arranged in the feed path of the edge material, in which zone the adhesive layer of the edge material is supplied with infrared radiation, and in that the device has a guide mechanism for guiding the edge material through the radiation exposure zone.

In the device according to the invention, the adhesive layer of the edge material is exposed to infrared radiation merely within a specifiable radiation exposure zone. The size of the radiation exposure zone, i.e. the geometric extent thereof, is specifiable. The spatial delimitation of the radiation exposure zone makes it possible in a simply designed manner to specify the energy introduced into the edge material by the infrared radiation precisely, so that merely the adhesive layer is activated by the energy input, but there is no adverse effect on the visible face of the edge material. For the precise introduction of a specifiable amount of energy into the edge material, it is significant that the edge material which is guided through the radiation exposure zone does not unintentionally change orientation relative to the infrared radiation within the radiation exposure zone. According to the invention, therefore, the device has a guide mechanism which guides the edge material through the radiation exposure zone. Owing to the guide mechanism, the orientation of the edge material within the radiation exposure zone can be specified relative to the direction of the infrared radiation. This makes it possible, for example, to orient the infrared radiation substantially perpendicularly to the adhesive layer of the edge material.

In a particularly preferred configuration of the invention, the size of the radiation exposure zone is changeable. This gives the possibility of adapting the size of the radiation exposure zone to the size of the edge material, i.e. in particular adapting it to the extent thereof in the vertical direction. Furthermore, the energy input which can be achieved by exposing the adhesive layer to infrared radiation within the radiation exposure zone can be changed by changing the length of the radiation exposure zone. By changing the size of the radiation exposure zone, adaptation of the device according to the invention to different edge material, in particular to different adhesive layers, can thus take place without for example the intensity and/or the wavelength of the infrared radiation emitted by the at least one infrared emitter having to be changed.

It is advantageous if the radiation exposure zone is surrounded by a housing with an entrance for introducing the edge material and an exit for guiding the edge material out. The housing specifies the extent of the radiation exposure zone and protects the user of the device from infrared radiation. Safety requirements which arise from the use of the infrared radiation can thus be met in a simply designed manner.

The guide mechanism preferably has at least one guide element which extends in the feed direction of the edge material along the radiation exposure zone, the edge material being movable along the at least one guide element. The at least one guide element ensures within the radiation exposure zone that the orientation of the edge material, in particular the orientation of the adhesive layer of the edge material, does not change unintentionally within the radiation exposure zone. The at least one guide element for this purpose extends in the feed direction of the edge material along the radiation exposure zone.

It is advantageous if the at least one guide element contacts the edge material linearly. The linear contact prevents the guide element from being adversely affected by the adhesive layer. On its way through the radiation exposure zone, the adhesive layer is exposed to infrared radiation and is therefore increasingly activated. The greater the degree of activation of the adhesive layer, the more must care be taken that the adhesive layer which is at least partially already activated does not come into contact with the at least one guide element over a large area. Contact over a large area is prevented by the linear contacting.

In a particularly preferred configuration of the invention, the at least one guide element has a fluted groove which receives an edge region of the edge material. The fluted groove may for example have a semicircular or V-shaped cross-section. The edge material may dip into the fluted groove with an edge region, in particular with a lower edge region, relative to the vertical, contacting the wall of the fluted groove only linearly and any changes in the material thickness of the edge material not adversely affecting the linear contacting. Fluctuations in the material thickness of the edge material thus result just as little in an adverse effect on the linear contacting as does the use of different edge materials which differ in their material thickness.

The at least one guide element extends along the radiation exposure zone and is therefore exposed to the infrared radiation. It is advantageous if the at least one guide element can be cooled by means of a constrainedly guided cooling medium, for example with the aid of cooling air or with the aid of a cooling liquid.

In a particularly preferred configuration of the invention, the at least one guide element has at least one cooling duct for a cooling medium. The cooling duct makes it possible to pass the cooling medium through the at least one guide element. This results in particularly effective cooling of the guide element.

For example cooling water can be used for cooling the guide element.

Preferably the at least one guide element is configured as a guide rail which forms a delimitation, oriented in the feed direction of the edge material, of the radiation exposure zone. The radiation exposure zone within which the edge material can be exposed to infrared radiation is thus delimited at least partially by the at least one guide rail. The guide rail thus takes on not only the function of guiding the edge material through the radiation exposure zone, but at the same time also forms a delimitation of the radiation exposure zone.

It is particularly advantageous if the guide mechanism has two guide elements arranged spaced apart from each other which extend along the radiation exposure zone, the edge material being movable along the two guide elements. The two guide elements may in each case form a guide rail and the edge material may be displaced along the guide rails. The feeding of the edge material can be achieved by the feed mechanism and the use of the two guide rails ensures that the edge material does not unintentionally change orientation relative to the infrared radiation within the radiation exposure zone.

It is particularly beneficial if the two guide elements form a lower and an upper guide rail which contact a lower edge and an upper edge of the edge material preferably linearly.

As already mentioned, it is beneficial if the guide rails in each case have a fluted groove. The fluted groove preferably has a semicircular or V-shaped cross-section and receives an edge region of the edge material, the edge material contacting the fluted groove merely linearly.

In an advantageous configuration of the invention, the two guide elements form an upper and a lower delimitation of the radiation exposure zone, the delimitations being oriented parallel to the feed path of the edge material. The guide elements may in each case form a housing part which surrounds the radiation exposure zone.

The distance between the two guide elements, in a preferred configuration of the invention, is changeable, in particular changeable by means of a motor. This gives the possibility of guiding edge material with different vertical extents through the radiation exposure zone. The distance between the two guide elements can for this purpose be adapted to the extent of the edge material. In particular, provision may be made for the distance between the guide elements to be able to be changed with the aid of a motor, for example an electric motor, or alternatively with the aid of a piston/cylinder unit.

Provision may for example be made for at least one of the guide elements to be arranged on a carriage which can be displaced in the vertical direction. The carriage can be displaced in specifiable manner with the aid of an electric motor, for example a servomotor, or alternatively with the aid of a piston/cylinder unit.

In an advantageous configuration of the invention, the radiation exposure zone on its side remote from the at least one infrared emitter is delimited by at least one absorber element. The absorber element ensures that the infrared radiation cannot emerge unintentionally from the radiation exposure zone even when there is no edge material in the radiation exposure zone. If edge material is lacking, the infrared radiation is for the most part absorbed by the absorber element.

The absorber element is beneficially plate-shaped.

It is advantageous if the absorber element can be cooled with the aid of a constrainedly guided cooling medium, for example by means of compressed air or with the aid of a cooling liquid, in particular with the aid of cooling water. The provision of the cooling medium ensures that no impermissible heating of the absorber element occurs even in the case of continuous use of the device according to the invention.

The absorber element may for example have at least one cooling duct for a cooling medium. The cooling medium, for example cooling water, can be passed through the cooling duct in order to cool the absorber element effectively.

As already mentioned, the guide mechanism preferably has at least one guide element. In such case, it is beneficial if an adjustment mechanism is held on the rear side of the absorber element which is remote from the radiation exposure zone for adjusting the position of the guide element. For example, the carriage already mentioned above may be used as adjustment mechanism.

The radiation exposure zone on its side facing the at least one infrared emitter is preferably delimited by a glass plate which is at least partially transparent to infrared radiation. The glass plate forms protection of the at least one infrared emitter from dust and dirt. In particular, the glass plate ensures that materials possibly evaporating from the adhesive layer within the radiation exposure zone do not readily reach the at least one infrared emitter.

In an advantageous configuration, the glass plate is held exchangeably on a glass-plate holding unit. This, in a simple manner, gives the user the possibility of exchanging the glass plate if required or of removing it from the glass-plate holding unit for cleaning purposes.

In an advantageous embodiment of the invention, a reflector is arranged on the rear side of the at least one infrared emitter which is remote from the radiation exposure zone. The reflector ensures that infrared radiation which is emitted by the at least one infrared emitter in the direction remote from the radiation exposure zone can be oriented at the radiation exposure zone. The reflector may for example be of ellipsoid or paraboloid form, by which the reflected infrared radiation can be parallelised, widened or bundled.

It is particularly advantageous if the reflector is held exchangeably on a reflector holding unit. This gives the user the possibility of adapting the reflector to the edge material being used in each case. In particular, this gives the user the possibility of changing the size of the radiation exposure zone by changing the reflector.

In order to keep radiation losses as low as possible, it is beneficial if the at least one infrared emitter is arranged immediately next to the radiation exposure zone, with merely a glass plate being positioned between the radiation exposure zone and the at least one infrared emitter. The distance between the at least one infrared emitter and the edge material which is guided through the radiation exposure zone can thereby be kept particularly low. Radiation losses are thereby reduced, so that the highest possible proportion of the infrared radiation emitted by the infrared emitter can be used for activating the adhesive layer of the edge material.

Alternatively, provision may be made for at least one optical element for deflecting, focusing and/or widening the infrared radiation emitted by the at least one infrared emitter to be arranged between the at least one infrared emitter and the radiation exposure zone. The at least one optical element may for example be designed as a lens, a prism or as a mirror. The optical element makes it possible to orient the infrared radiation emitted by the at least one infrared emitter optimally at the adhesive layer of the edge material.

The at least one optical element is preferably held exchangeably on an element support. This gives the possibility of adapting the orientation of the infrared radiation to the size of the edge material and in particular to the size of the respective adhesive layer by using different optical elements.

Provision may also be made for the optical transmission properties of at least one optical element which is arranged between the at least one infrared emitter and the radiation exposure zone to be controllable. For example, provision may be made for the focal distance of a lens which is used as the optical element to be able to be changed. The change in the optical transmission property may take place for example manually or by supplying with an electrical control voltage.

In an advantageous configuration of the invention, the at least one infrared emitter is held adjustably relative to the feed path of the edge material. This gives for example the possibility of changing the distance which the at least one infrared emitter assumes relative to the edge material. Alternatively or in addition, provision may be made for the orientation of the at least one infrared emitter relative to the feed path of the edge material to be able to be changed. For example, a rod-shaped infrared emitter extending substantially in the feed direction may be used, which emitter can be pivoted about a horizontal pivot axis oriented perpendicularly to the feed direction. As a result, the inclination of the rod-shaped infrared emitter relative to a horizontal plane can be changed. The angle of inclination can be adapted to the height of the edge material, in particular to the height of the adhesive layer of the edge material. The larger the adhesive layer, the larger is set the angle of inclination which the infrared emitter assumes relative to the horizontal plane, so that the adhesive layer during the feed movement of the edge material within the radiation exposure zone can be reliably exposed to infrared radiation over its entire height.

The edge material can be supplied continuously to the workpiece, and in order to adapt the continuously supplied edge material to the length of the narrow side of the workpiece the device has a severing blade for separating off edge material. The edge material may be provided for example as rolls, and a desired length of the edge material can be separated off by means of the severing blade.

In an advantageous configuration of the invention, the severing blade is mechanically uncoupled from the at least one infrared emitter. This ensures that mechanical vibrations which are produced upon edge material being separated off by the severing blade are not readily transmitted to the at least one infrared emitter. Adverse affecting of the at least one infrared emitter by the mechanical vibration caused by the severing blade can thereby be kept slight.

In order to be able to attain a clean severing cut with the aid of the severing blade, it is advantageous if the severing blade is arranged relative to the feed path of the edge material in front of the entrance to the radiation exposure zone. This gives the possibility of still separating off the edge material before the adhesive layer of the edge material is activated by the infrared radiation. If the severing blade performs a severing cut in a region of the edge material in which the adhesive layer has already been activated, the activated adhesive layer could smear the severing blade or pass through the severing cut onto the visible face of the edge material. The edge material, in a preferred configuration of the invention, is therefore already separated off by means of the severing blade even before the adhesive layer is activated.

Provision may however also be made for the severing blade to be arranged relative to the feed path of the edge material behind an exit from the radiation exposure zone. The severing blade may in such case have a non-stick coating, so that the risk of the activated adhesive layer adhering to the severing blade and being able to reach the visible face of the edge material via the severing blade can be kept low.

It is particularly advantageous if the device has a screen which can be positioned between the radiation exposure zone and the at least one infrared emitter, which screen is movable back and forth between a covering position and a release position. In its covering position, the screen blocks the beam path between the at least one infrared emitter and the radiation exposure zone, so that no infrared radiation can pass into the radiation exposure zone. By positioning the screen in its covering position, it is thus possible to prevent the adhesive layer of an edge material located in the radiation exposure zone from being activated. In its release position, the screen releases the beam path between the at least one infrared emitter and the radiation exposure zone, so that the infrared radiation can pass unhindered into the radiation exposure zone in order to activate the adhesive layer of an edge material located in the radiation exposure zone.

It is particularly beneficial if the screen is movable in the feed direction synchronously to the feed movement of the edge material to protect an edge-material region from infrared radiation. In such a configuration of the invention, the screen initially assumes its release position, so that the adhesive layer of edge material which is guided through the radiation exposure zone can be reliably activated. However, as soon as a specifiable length of the edge material has been guided through the radiation exposure zone, upon further feeding of edge material a rear—in the feed direction— edge-material region can be protected from infrared radiation in that the screen which is movable synchronously and parallel to the edge material is transferred out of its release position into its covering position. The screen is thus moved in the feed direction together with the edge material. The edge material can be guided through the radiation exposure zone and then behind the exit from the radiation exposure zone the region of the edge material which is protected from infrared radiation can be separated off from that region of the edge material which is exposed to the infrared radiation by means of a severing blade which is arranged behind the exit from the radiation exposure zone. The region of the edge material which is protected from infrared radiation can then be moved out of the radiation exposure zone counter to the feed direction and can then subsequently be reused for fixing to the narrow side of another workpiece, in which case the screen then assumes its release position and the edge material can be exposed to the infrared radiation. Losses of edge material can thus be kept low.

Alternatively or in addition to a screen which is movable synchronously to the edge material in the feed direction, the device according to the invention may have a large number of infrared emitters which are arranged along the feed path of the edge material and can be switched on and/or off in succession synchronously to the feed movement of the edge material. This gives for example the possibility of switching off the infrared emitters arranged along the feed path in succession synchronously to the movement of the edge material as soon as such a length of edge material has been guided through the radiation exposure zone that the narrow side of a particular workpiece can be coated by the edge material. Thus, upon guiding edge material through, merely a front—in the feed direction—region of the edge material is still exposed to infrared radiation, whereas a rear region is no longer exposed.

Behind the exit from the radiation exposure zone, the region of the edge material which has not been exposed to any infrared radiation can be separated off from the region of the edge material which has been exposed to the infrared radiation by means of a severing blade. The region which has not been exposed to radiation can then be pulled out of the entrance to the radiation exposure zone counter to the feed direction and then be reused for fixing to the narrow side of another workpiece. The loss of edge material upon activation of the adhesive layer thereof by means of infrared radiation can thus be kept very low.

The intensity of the infrared radiation emitted by the at least one infrared emitter is beneficially controllable. This gives the possibility of adapting the intensity of the infrared radiation to the adhesive layer of the edge material being used in each case. If for example a relatively thick adhesive layer is used, the intensity of the at least one infrared emitter can be increased, and when a relatively thin adhesive layer is used the intensity of the at least one infrared emitter can be reduced.

The intensity of the emitted infrared radiation can also be adapted to the absorption properties of the edge material, in particular to the absorption properties of the adhesive layer. This gives the possibility of selecting a different intensity for a very high absorption than for a low absorption.

It is particularly advantageous if the intensity of the infrared radiation emitted by the at least one infrared emitter is controllable dependent on the feed rate of the edge material. This gives in particular the possibility of selecting a higher intensity for a high feed rate than for a low feed rate. Regardless of the feed rate, the same energy input into the activatable adhesive layer of the edge material can thereby be achieved for a specified length of the radiation exposure zone if the edge material is guided through the radiation exposure zone.

It is particularly beneficial if the at least one infrared emitter is controllable dependent on the movement state of the edge material. This gives the possibility of switching off the at least one infrared emitter if the movement of the edge material stops for example because of a malfunction of the feed mechanism. An impermissibly high energy input into the adhesive layer of the edge material located in the radiation exposure zone is thereby avoided.

The pre-heating time of the at least one infrared emitter is very short. Preferably the pre-heating time is approximately 1 second. This gives the possibility of only switching on the at least one infrared emitter when the moving edge material attains a specifiable position relative to the at least one infrared emitter.

The at least one infrared emitter and in particular the electrical connecting contacts thereof experience heating during operation of the device. It is therefore beneficial if at least the electrical connecting contacts of the at least one infrared emitter can be cooled by a constrainedly guided cooling medium. As a result, in the event of continuous operation of the device a practically constant temperature above all of the electrical connecting contacts of the at least one infrared emitter can be achieved. For example, cooling air, or alternatively a cooling liquid, may be used as cooling medium.

Provision may be made for not only the electrical connecting contacts of the at least one infrared emitter, but the entire infrared emitter, to be able to be cooled by a constrainedly guided cooling medium. For example, the at least one infrared emitter may be positioned in the path of flow of a cooling air.

In an advantageous configuration of the invention, the at least one infrared emitter is arranged in a housing which has cooling ducts for a cooling medium.

It is beneficial if the housing has at least one cooling-air duct which can be connected to a fan. By means of the fan, a cooling-air flow can be achieved in the at least one cooling-air duct, under the action of which flow at least the electrical connecting contacts of the at least one infrared emitter can be cooled.

It is particularly beneficial if the at least one infrared emitter is controllable dependent on the pressure prevailing in the cooling-air duct and/or dependent on the flow rate of the cooling air prevailing in the cooling-air duct. This gives the possibility of switching off the infrared emitter and/or preventing the infrared emitter from being started up, as long as no cooling air is flowing through the cooling-air duct. For this purpose, for example a flow monitor may be used which switches off the at least one infrared emitter and prevents the at least one infrared emitter from being started up if it does not detect any cooling-air flow in the cooling-air duct. Provision may also be made for a pressure sensor to be arranged in the cooling-air duct, which sensor switches off the at least one infrared emitter and prevents the at least one infrared emitter from being started up, as long as there is no specified underpressure or no specified overpressure prevailing in the cooling-air duct. Overheating of the at least one infrared emitter due to lack of air cooling can be reliably avoided thereby.

It is advantageous if the electrical connecting contacts of the at least one infrared emitter are connected in thermally conductive manner to at least one heat sink which is arranged in a cooling duct. Heat can be given off from the electrical connecting contacts via the heat sink. The heat sinks are beneficially arranged in a cooling-air duct which is in a flow connection with a fan.

The following description of advantageous embodiments of the invention, in conjunction with the drawings, serves to explain it in greater detail.

DETAILED DESCRIPTION

FIGS. 1 to 5 show schematically a first advantageous embodiment of a device according to the invention which is assigned overall the reference numeral 10. The device 10 makes it possible to supply a band-shaped or strip-shaped edge material 12 to a panel-shaped workpiece 14, in particular a wooden workpiece, which is moved in a direction of transport 16. Units for moving the workpiece 14 are not shown in the drawings, since they are known per se to the person skilled in the art.

Figure 1:
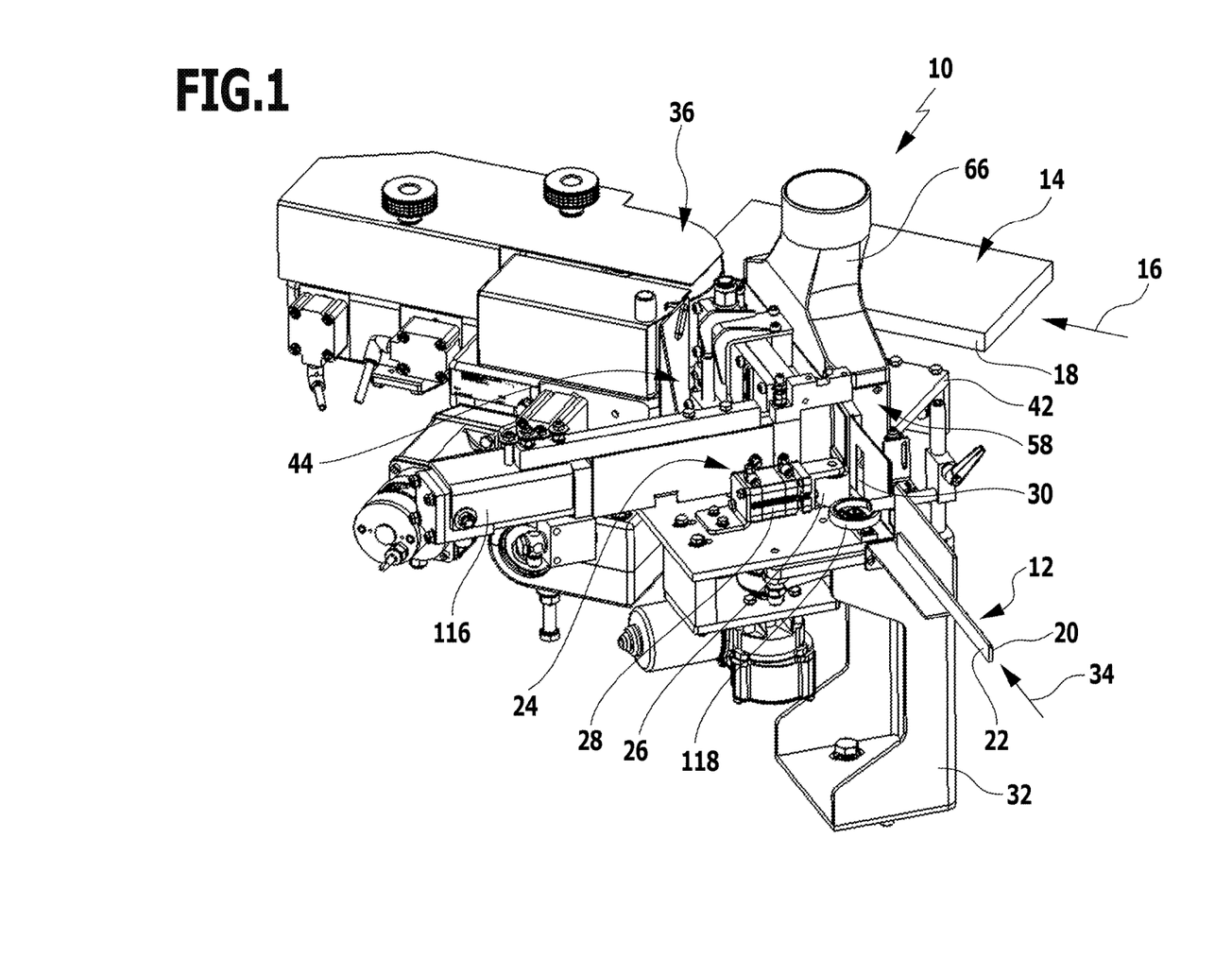
FIG. 1: is a perspective view of a first advantageous embodiment of a device according to the invention for fixing an edge material to a narrow side of a panel-shaped workpiece.
Figure 2:
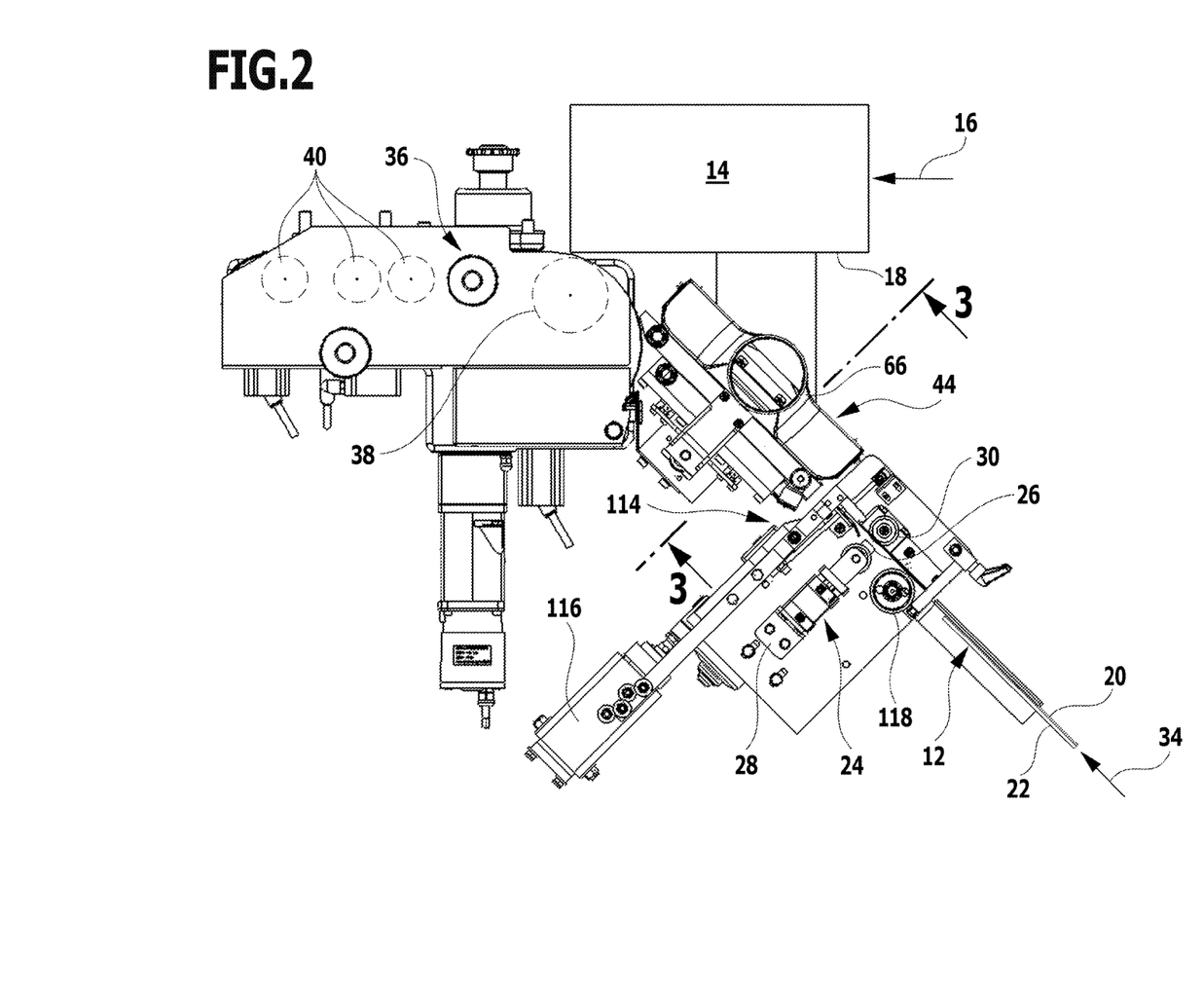
FIG. 2: is a top view of the device of FIG. 1.

The edge material 12 may be fixed to a narrow side 18 of the workpiece 14. The edge material 12 for this purpose has on its rear side facing the workpiece 14 an adhesive layer 20.

The adhesive layer 20 cannot be recognised on the visible face 22 of the edge material 12 remote from the workpiece 14.

The edge material 12 may be unrolled from rolls, which are not shown in the drawings in order to obtain a better overview, and may be supplied continuously to the workpiece 14 with the aid of a feed mechanism 24. The feed mechanism 24 has a feed roller 26, which can be caused to rotate by a feed motor 28. The feed roller 26 cooperates with a counter-roller 30 which is mounted in freely rotatable manner on a first machine frame 32. By means of the feed roller 26 and the counter-roller 30, the edge material 12 can be moved in a feed direction 34 along a feed path by the feed mechanism 24 to the narrow side 18 of the workpiece 14.

If the edge material 12 has reached the narrow side 18, it can be pressed against the narrow side 18 by a pressing mechanism 36. The pressing mechanism 36 has a pressing roller 38 and a plurality of subsequent pressing rollers 40 succeeding the pressing roller 38.

In the region between the feed mechanism 24 and the pressing mechanism 36 there is arranged on a second machine frame 42, which is mechanically uncoupled from the first machine frame 32, an irradiation unit 44 with a first infrared emitter 46 and a second infrared emitter 48. The two infrared emitters 46, 48 are oriented parallel to each other and extend along the feed path of the edge material 12. The first infrared emitter 46 is arranged above the second infrared emitter 48. Both infrared emitters 46, 48 are rod-shaped and have offset electrical connection elements 50, 52 oriented perpendicularly to the feed direction 34, which are each connected in thermally conductive manner to a heat sink 54, 56. The two infrared emitters 46, 48 are surrounded by a cooling housing 58. The cooling housing 58 is formed by a first housing part 60 which receives the two infrared emitters 46, 48 with the exception of their electrical connection elements 50, 52 and by a second housing part 62 which receives the electrical connection elements 50 and by a third housing part 64 which receives the electrical connection elements 52. The first housing part 60, just like the second housing part 62 and the third housing part 64, forms a cooling-air duct. The cooling ducts are in a flow connection with an extraction hood 66. To the extraction hood 66 can be connected a suction line, not shown in the drawings in order to obtain a better overview, via which line the extraction hood 66 is in a flow connection with a fan which is known per se and therefore is likewise not shown in the drawings. By means of the fan, a cooling-air flow can be obtained which extends through the first housing part 60 and also through the second housing part 62 and the third housing part 64 and also through the extraction hood 66. In the extraction hood 66 is arranged a pressure sensor 68 which is electrically connected to a control unit not illustrated in the drawings. By means of the pressure sensor 68, a pressure prevailing in the extraction hood 66 can be detected and can provide the control unit with a corresponding control signal. The control unit controls the supply of electrical energy to the two infrared emitters 46, 48. The two infrared emitters 46, 48 can only be set into operation when a specifiable underpressure prevails in the extraction hood 66. If the underpressure drops, the infrared emitters 46, 48 are switched off by the control unit.

Figure 3:
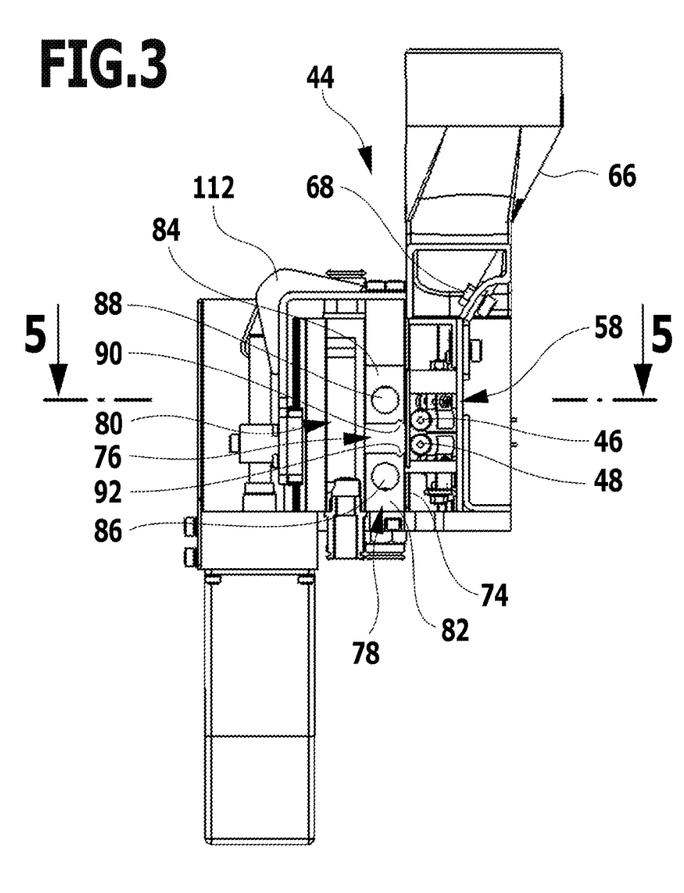
FIG. 3: is a sectional view of an irradiation unit of the device along the line 3-3 in FIG. 2.
Figure 4:
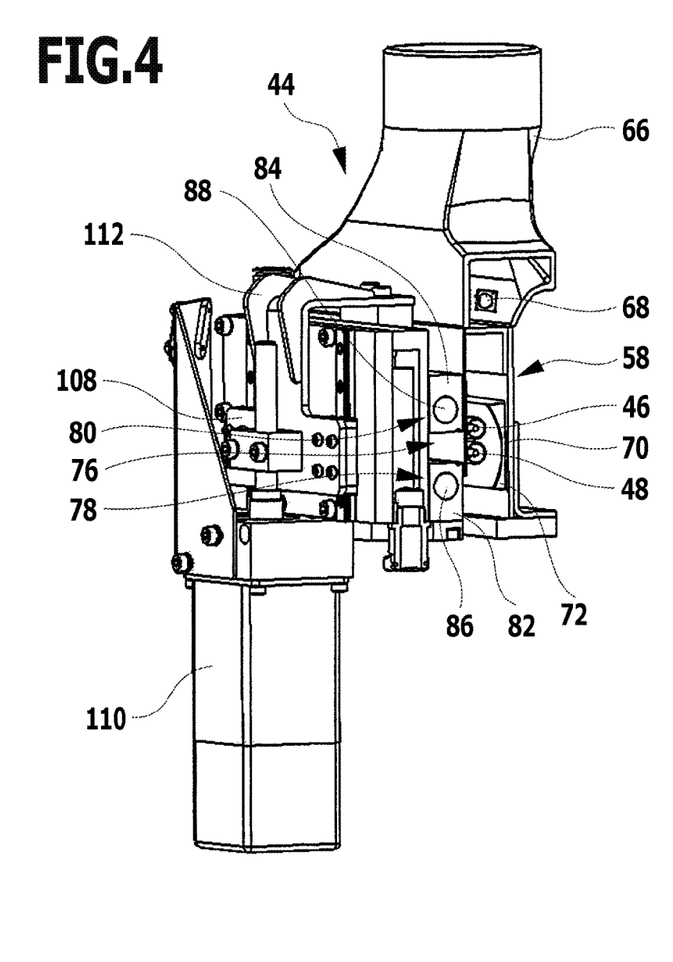
FIG. 4: is a partially separated perspective view of the irradiation unit of FIG. 3.
Figure 5:
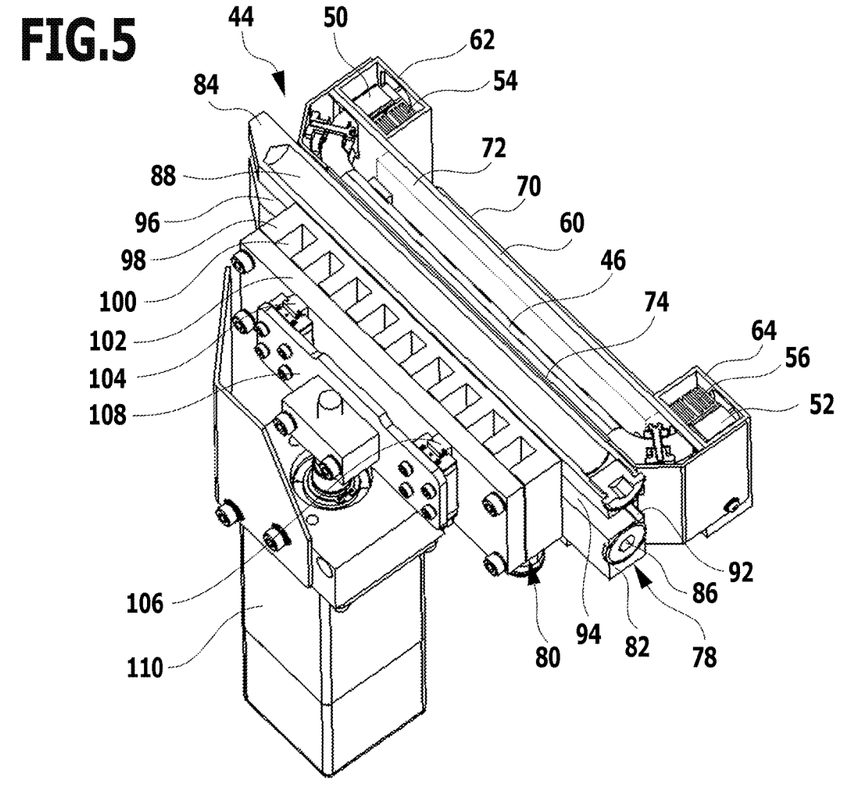
FIG. 5: is a sectional view of the irradiation unit along the line 5-5 in FIG. 3.

The first housing part 60, which receives the infrared emitters 46, 48 with the exception of their electrical connection elements 50, 52, has a rear wall 70 on which a reflector 72 is detachably held. The end wall of the first housing part 60 which lies opposite the rear wall 70 is formed by a glass plate 74 which is transparent to infrared radiation. The glass plate 74 is immediately adjoined by a radiation exposure zone 76 which is delimited in the vertical direction by a guide mechanism 78 and in the horizontal direction by the glass plate 74 and by an absorber element 80, and through which the edge material 12 can be guided by the feed mechanism 24 to the narrow side 18 of the workpiece 14.

The guide mechanism 78 has a first guide element in the form of a lower guide rail 82 and a second guide element in the form of an upper guide rail 84. The two guide rails 82, 84 extend in the feed direction 34 parallel to the two infrared emitters 46, 48 and are arranged spaced apart from each other. The two guide rails 82, 84 each have a cooling-water duct 86, 88 and can be cooled by the cooling water. Facing each other, the guide rails 82, 84 each have a fluted groove 90, 92 which is semicircular in cross-section, into which the edge material 12 can dip with a lower edge portion or an upper edge portion. The semicircular configuration of the fluted grooves 90, 92 ensures that the edge material 12 lies only linearly against the guide rails 82, 84.

The two guide rails 82, 84, the glass plate 74 and the absorber element 80 form a housing of the radiation exposure zone 76 which surrounds the radiation exposure zone 76 with the exception of an entrance 94 and an exit 96.

The absorber element 80 is formed in two parts and comprises an inner absorber plate 98 which faces the two guide rails 82, 84 and on its rear side remote from the guide rails 82, 84 bears a meandering cooling-water duct 100, and an outer absorber plate 102 which covers the cooling-water duct 100 and is screwed to the inner absorber plate 98.

The outer absorber plate 102 bears on its rear side remote from the inner absorber plate 98 an adjustment mechanism with a first guide profile 104 and a second guide profile 106. The two guide profiles 104, 106 are vertically oriented and serve to mount a carriage 108 which can be displaced by a motor 110 along the guide profiles 104, 106.

The upper guide rail 84 is connected rigidly to the carriage 108 via a retaining clamp 112 which engages around the absorber element 80 and can be adjusted in the vertical direction together with the carriage 108 by the motor 110. This gives the possibility of adapting the distance which the upper guide rail 84 assumes relative to the lower guide rail 82 to the vertical extent of the edge material 12.

The extent of the radiation exposure zone 76 can thus be changed by adjusting the upper guide rail 84.

In the embodiment illustrated in FIGS. 1 to 5, a severing blade 114 is arranged on the first machine frame 32 in the region between the feed mechanism 24 and the irradiation unit 44, which blade can be moved back and forth by a drive unit 116 perpendicularly to the feed direction 34 in order to separate off the edge material 12.

As already mentioned, the edge material 12, which is frequently also referred to as an "edge veneer", can be supplied to the narrow side 18 of the workpiece 14. On the way to the narrow side 18, the adhesive layer 20 arranged on the rear side of the edge material 12 can be activated by being exposed in the radiation exposure zone 76 to infrared radiation which is emitted by the two infrared emitters 46, 48. The intensity of the infrared radiation can be adapted to the feed rate of the edge material 12. The greater the feed rate which is selected, the higher can the intensity of the infrared radiation be selected.

The movement state of the edge material 12 can be detected by a movement sensor, in the example of embodiment illustrated by a rotary transducer 118, which is rotatably mounted on the first machine frame 32 on the side of the feed mechanism 24 remote from the severing blade 114 and is electrically connected to the control unit, not shown in the drawings, of the device 10. The rotary transducer 118 detects the movement of the edge material 12. As long as the edge material 12 does not perform any movement, the energy supply to the two infrared emitters 46, 48 is interrupted because of the signal provided by the rotary transducer 118. The energy supply to the infrared emitters 46, 48 is only provided if the rotary transducer 118 detects a movement of the edge material 12.

During operation of the device 10, the absorber element 80 and also the two guide rails 82, 84 and the cooling housing 58 are cooled continuously, so that during continuous operation of the device 10 a substantially constant temperature occurs for the absorber element 80, the two guide rails 82, 84, the cooling housing 58 and also the infrared emitters 46, 48 and their electrical connection elements 50, 52.

The intensity of the infrared emitters 46, 48 can be controlled dependent on the degree of absorption of the edge material 12 used in each case, so that it is ensured that, during the time in which the edge material 12 is located in the radiation exposure zone 76, the adhesive layer 20 is reliably activated, without thereby adversely affecting the visible face 22 of the edge material 12. The guidance of the edge material 12 in the radiation exposure zone 76 is ensured by the two guide rails 82, 84, which contact the edge material 12 merely linearly.

Figure 6:
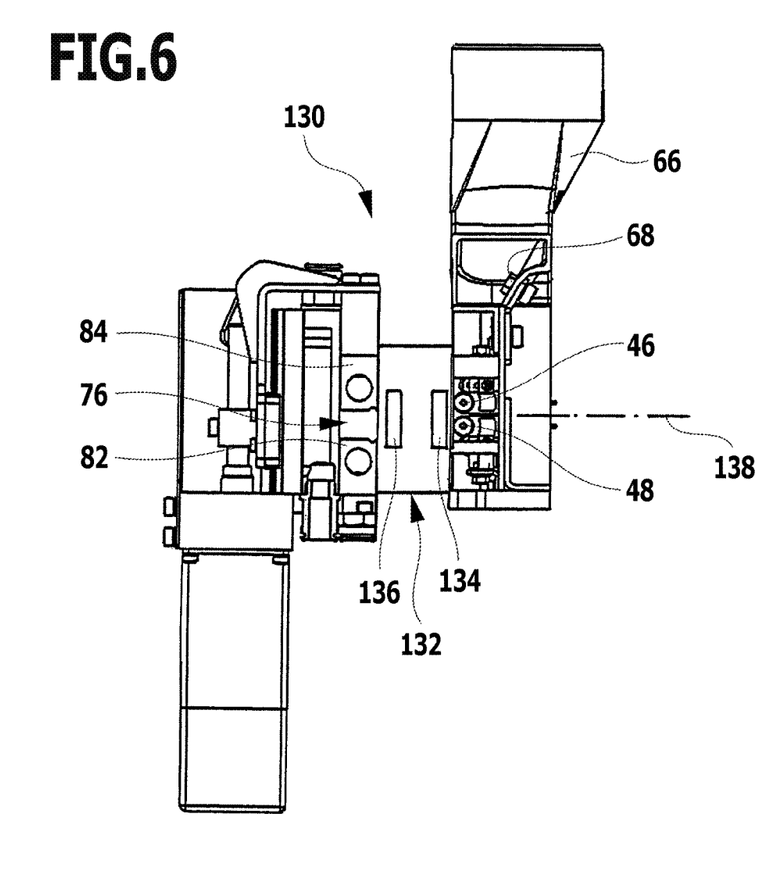
FIG. 6: is a sectional view, corresponding to FIG. 3, of a second advantageous embodiment of a device according to the invention for fixing edge material.
Figure 7:
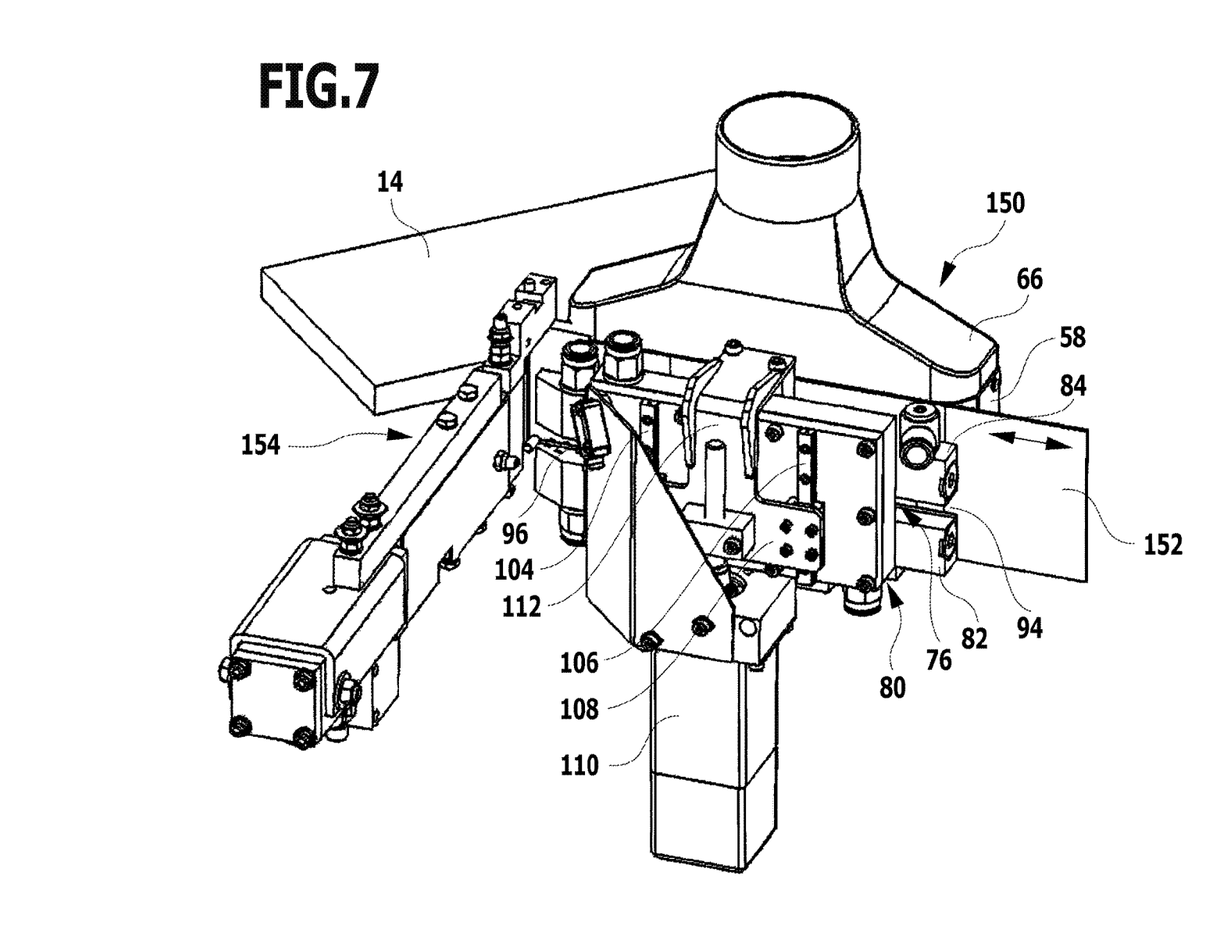
FIG. 7: is a perspective partial representation of a third advantageous embodiment of a device according to the invention for fixing edge material.
Figure 8:
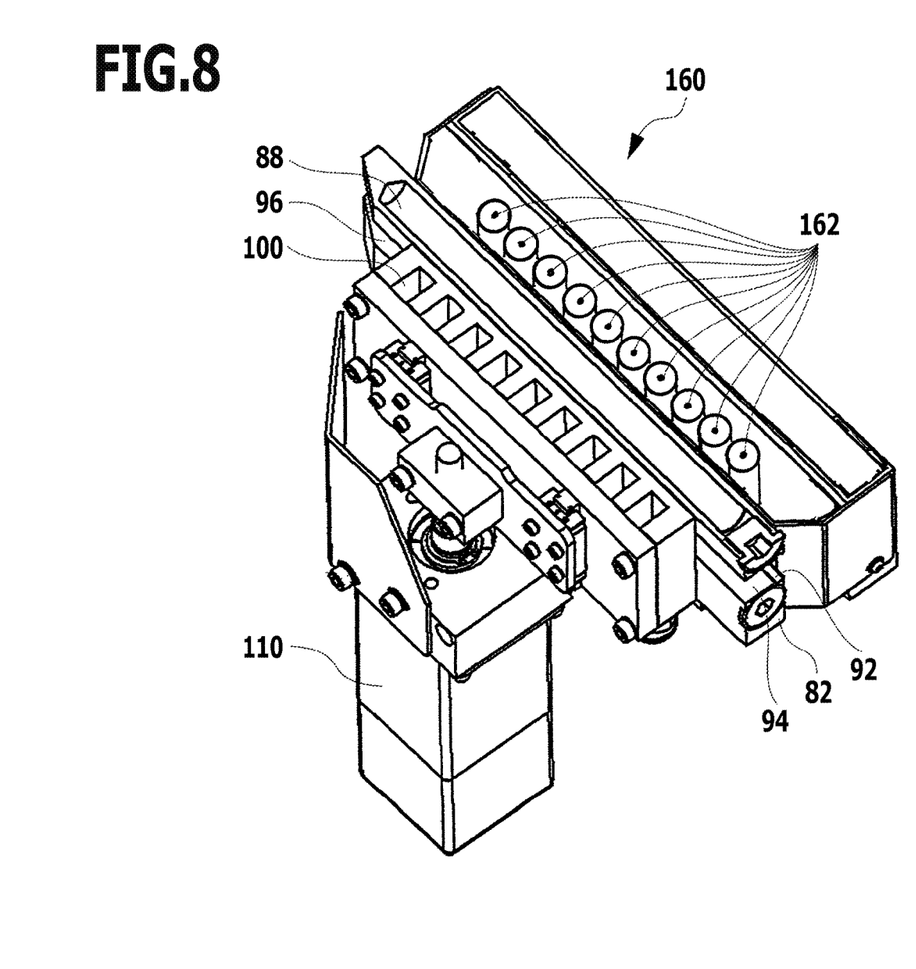
FIG. 8: is a sectional view, corresponding to FIG. 5, of a fourth advantageous embodiment of a device according to the invention for fixing edge material.

In FIG. 6, a second advantageous embodiment of a device according to the invention for fixing edge material to the narrow side of a panel-shaped workpiece is shown in excerpts. FIG. 6 shows merely a sectional view of the irradiation unit used in the second advantageous embodiment, which is assigned overall the reference numeral 130 in FIG. 6. The remaining components of the device illustrated in FIG. 6, just as in the advantageous embodiments discussed in greater detail below, which are illustrated in FIGS. 7 and 8, are identical to those of the device 10 which has already been discussed above with reference to FIGS. 1 to 5. With respect to these components, reference is made to the above statements in order to avoid repetition.

The irradiation unit 130 differs from the irradiation unit 44 illustrated in FIG. 3 in that an optical transmission equipment 132, with optical elements 134, 136, is arranged between the cooling housing 58 which receives the two infrared emitters 46, 48 and the radiation exposure zone 76. By means of the optical transmission equipment 132, the infrared radiation emitted in the direction of the radiation exposure zone 76 by the infrared emitters 46, 48 can be deflected, focused and/or widened. This gives the possibility of also changing the beam path of the infrared radiation emitted by the infrared emitters when changing the distance between the two guide rails 82, 84. If the distance between the guide rails 82, 84 is reduced, the infrared radiation can be focused. If the distance between the guide rails 82, 84 is increased, the infrared radiation can be widened.

The second advantageous embodiment of the device according to the invention illustrated in FIG. 6 furthermore differs from the device 10 discussed above in that the cooling housing 58 with the infrared emitters 46, 48 arranged therein can be pivoted about a horizontal pivot axis 138 oriented perpendicularly to the feed direction 34. This gives the possibility of inclining the rod-shaped infrared emitters 46, 48 relative to a horizontal plane, so that the infrared emitters 46, 48 in the region between the two guide rails 82, 84 extend over an increased height, and as a result edge material 12 which extends in the vertical direction over a relatively great height can also be reliably exposed to infrared radiation over the entire height.

In FIG. 7, a third advantageous embodiment of a device according to the invention for fixing edge material to the narrow side of a workpiece is illustrated schematically, FIG. 7 merely showing an alternative configuration of an irradiation unit which is assigned overall the reference numeral 150 and a severing blade 154. As already mentioned, the remaining components of the third advantageous embodiment of a device according to the invention are identical to those of the device 10 schematically designated in FIGS. 1 to 5. The irradiation unit 150 differs from the irradiation unit 44 discussed above with reference to FIGS. 1 to 5 in that a screen 152 can be positioned between the cooling housing 58 and the radiation exposure zone 76, which screen is movable back and forth synchronously to the feed movement of the edge material 12 between a release position and a covering position. The screen 152 can be moved out of its release position in the feed direction 34 into its covering position by means of a drive unit not shown in the drawings, preferably by means of an electric motor. By means of the screen 152, thus edge material, in particular the adhesive layer 20 of the edge material, can be protected from infrared radiation within the radiation exposure zone 76. This gives the possibility of exposing the edge material 12 to infrared radiation on the rear side only over such a length as is necessary for coating the narrow side 18 of a particular workpiece 14. Excess edge material can be covered within the radiation exposure zone 76 by the screen 152. The severing blade 114 arranged in the first embodiment between the feed mechanism 24 and the irradiation unit 44 can in such case be replaced by the severing blade 154 positioned behind the exit from the radiation exposure zone 76, i.e. in the region between the irradiation unit 150 and the workpiece 14. Once the edge material has passed through the radiation exposure zone 76, the edge material 12 can be separated off by means of the severing blade 154 which succeeds the radiation exposure zone 76. Excess edge material can be covered by the screen 152 and can therefore be moved back counter to the feed direction 34 after separating off, so that it can be used for coating the narrow side of a further workpiece. The loss of edge material can thereby be kept particularly low.

FIG. 8 schematically illustrates an irradiation unit 160 of a fourth advantageous embodiment of a device according to the invention for fixing edge material to the narrow side of a workpiece. The irradiation unit 160 differs from the irradiation unit 44 described above with reference to FIGS. 1 to 5 in that instead of the first infrared emitter 46 and the second infrared emitter 48 oriented parallel to the first infrared emitter 46 a large number of infrared emitters 162 which are each vertically oriented and arranged in series in the feed direction 34 are used, which extend in the vertical direction and can be switched on and/or switched off in succession synchronously to the feed movement of the edge material 12. In a similar manner as by the use of the screen 152, it can be ensured by the infrared emitters 162 which can be switched off in succession synchronously to the feed movement of the edge material 12 that excess edge material is practically not exposed to infrared radiation. A severing blade 154 (not shown in FIG. 8) can be arranged in the same manner as in the configuration schematically illustrated in FIG. 7 in the region between the irradiation unit 160 and the workpiece 14. Excess edge material can be separated off by means of the severing blade 154 and then be pulled out of the radiation exposure zone 76 counter to the feed direction 34, the excess edge material not having been exposed to infrared radiation, since the infrared emitters 162 were switched off synchronously to the movement of the edge material upon entry of the excess edge material into the radiation exposure zone 76. The excess edge material can thus be used for coating the narrow side of a further workpiece. The advantageous embodiment of the device according to the invention illustrated in FIG. 8 is thus also distinguished by a particularly low loss of edge material. Upon introduction of edge material into the radiation exposure zone, the infrared emitters 162 can beneficially be switched on in succession synchronously to the feed movement of the edge material 12.

What is claimed is:

1. A device for fixing a band-shaped or strip-shaped edge material to a narrow side of a panel-shaped workpiece, comprising:
    a feed mechanism for supplying the edge material along a feed path to the narrow side of the workpiece,
    at least one infrared emitter for activating an adhesive layer, facing the workpiece, of the edge material,
    a pressing mechanism for pressing the edge material onto the narrow side of the workpiece,
    a radiation exposure zone with a specifiable size being arranged in the feed path of the edge material, in which zone the adhesive layer of the edge material is exposed to infrared radiation, and
    a guide mechanism for guiding the edge material through the radiation exposure zone, wherein:
    the guide mechanism comprises two guide elements which are arranged spaced apart from one another and which extend in a feed direction along the radiation exposure zone, the edge material being able to be introduced between the two guide elements and being movable along the two guide elements,
    each of the two guide elements comprise at least one cooling duct for a cooling medium.

2. A device according to claim 1, wherein on a side of the radiation exposure zone remote from the at least one infrared emitter, the radiation exposure zone is delimited by at least one absorber element.

3. A device according to claim 2, wherein the absorber element comprises at least one further cooling duct for a cooling medium.

4. A device according to claim 2, wherein an adjustment mechanism is held on a rear side of the absorber element which is remote from the radiation exposure zone for adjusting a position of a guide element of the guide mechanism.

5. A device according to claim 1, further comprising a severing blade for separating off edge material, the severing blade being mechanically uncoupled from the at least one infrared emitter.

6. A device according to claim 5, wherein the severing blade is arranged relative to the feed path of the edge material in front of an entrance to the radiation exposure zone.

7. A device according to claim 5, wherein the severing blade is arranged relative to the feed path of the edge material behind an exit from the radiation exposure zone.

8. A device according to claim 1, wherein the at least one infrared emitter is arranged in a housing which has additional cooling ducts for a cooling medium.

9. A device according to claim 8, wherein the housing comprises at least one cooling-air duct which is adapted to be connected to a fan.

10. A device according to claim 9, wherein the at least one infrared emitter is controllable dependent on a pressure prevailing in the cooling-air duct and/or dependent on a flow rate of the cooling air prevailing in the cooling-air duct.

11. A device according to claim 1, wherein a distance between the two guide elements is changeable.

12. A device according to claim 11, wherein at least one of the two guide elements is held on a carriage which is adapted to be displaced in a vertical direction.

13. A device according to claim 1, further comprising a screen which is adapted to be positioned between the radiation exposure zone and the at least one infrared emitter, which screen is movable back and forth between a covering position and a release position.

14. A device according to claim 13, wherein the screen is movable in the feed direction synchronously to a feed movement of the edge material to protect an edge-material region from infrared radiation.

15. A device according to claim 1, wherein an intensity of the infrared radiation emitted by the at least one infrared emitter is controllable.

16. A device according to claim 15, wherein the intensity of the infrared radiation emitted by the at least one infrared emitter is controllable dependent on a feed rate of the edge material.

17. A device according to claim 1, wherein the specifiable size of the radiation exposure zone is changeable.

18. A device according to claim 1, wherein the radiation exposure zone is surrounded by a housing with an entrance for introducing the edge material and an exit for guiding the edge material out.

19. A device according to claim 1, wherein the two guide elements are each adapted to contact the edge material linearly.

20. A device according to claim 1, wherein the two guide elements each comprise a fluted groove which is adapted to receive an edge region of the edge material.

21. A device according to claim 1, wherein the two guide elements are each configured as a guide rail which forms a delimitation, oriented in the feed direction of the edge material, of the radiation exposure zone.

22. A device according to claim 1, wherein the two guide elements form a lower and an upper guide rail which contact a lower edge and an upper edge of the edge material.

23. A device according to claim 1, wherein the two guide elements form a lower and an upper delimitation of the radiation exposure zone.

24. A device according to claim 1, wherein on a side of the radiation exposure zone facing the at least one infrared emitter, the radiation exposure zone is delimited by a glass plate.

25. A device according to claim 1, wherein a reflector is arranged on a rear side of the at least one infrared emitter which is remote from the radiation exposure zone.

26. A device according to claim 1, wherein the at least one infrared emitter is arranged immediately next to the radiation exposure zone, with only a glass plate being positioned between the radiation exposure zone and the at least one infrared emitter.

27. A device according to claim 1, wherein at least one optical element for deflecting, focusing and/or widening the infrared radiation emitted by the at least one infrared emitter is arranged between the at least one infrared emitter and the radiation exposure zone.

28. A device according to claim 1, wherein the at least one infrared emitter is held adjustably relative to the edge material.

29. A device according to claim 1, further comprising a plurality of infrared emitters which are arranged next to each other along the feed path of the edge material and which are adapted to be switched on and/or off in succession synchronously to a feed movement of the edge material.

30. A device according to claim 1, wherein the at least one infrared emitter is controllable dependent on a movement state of the edge material.

31. A device according to claim 1, wherein the at least one infrared emitter comprises electrical connecting contacts which are adapted to be cooled by a constrainedly guided cooling medium.

* * * * *